June 12, 1934.　　　　J. J. KANE　　　　1,962,352
MEANS AND METHOD OF WELDING PIPE
Filed April 11, 1932
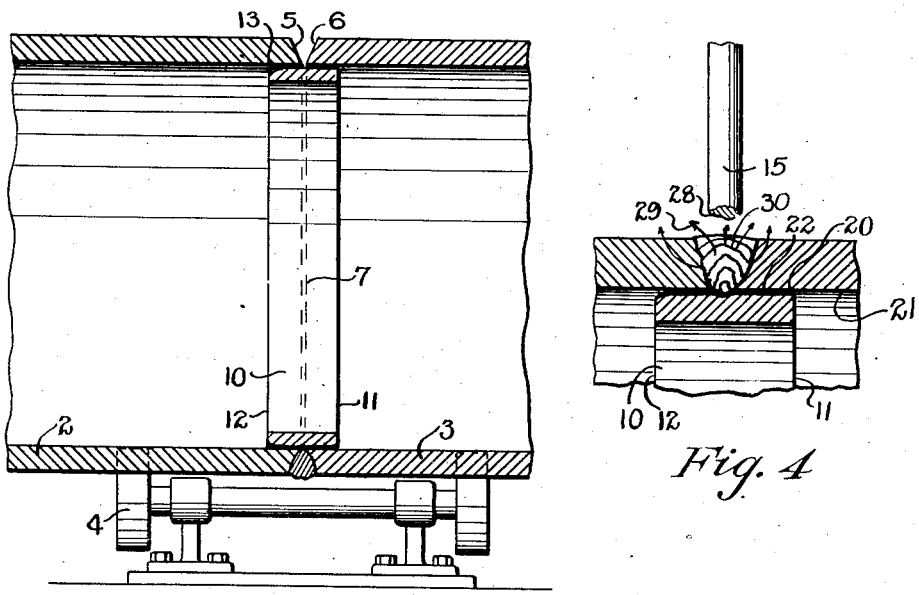
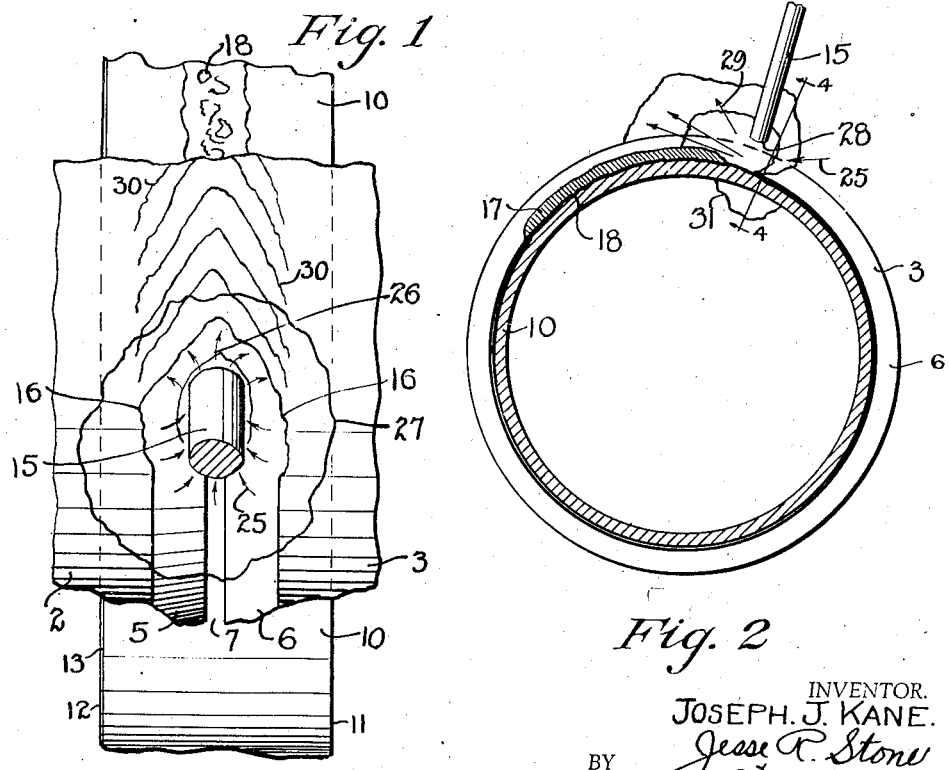
Fig. 1
Fig. 4
Fig. 3
Fig. 2
INVENTOR.
JOSEPH J. KANE.
BY Jesse R. Stone
Lester B. Clark
ATTORNEYS.

Patented June 12, 1934

1,962,352

UNITED STATES PATENT OFFICE 1,962,352

MEANS AND METHOD OF WELDING PIPE

Joseph J. Kane, Galveston, Tex.

Application April 11, 1932, Serial No. 604,468

19 Claims. (Cl. 219—10)

The invention relates to an improvement in welding operations where it is desirable to obtain a smooth, strong weld of substantially the same thickness as the material being welded.

It is one of the objects of the invention to provide a backing for welding operations wherein the backing assists in obtaining a weld having a fine texture and great ductility.

Another object of the invention is to provide a method of welding wherein a gas is generated during the welding operations to form a shield at the base of the weld.

Another object of the invention is to provide a backing for welds which is adapted to be charred by the heat of the welding operation so that a gas will be given off in the area adjacent the base of the weld.

Another object of the invention is to provide a backing for welds which will give off carbon monoxide gas for the purpose of uniting with oxygen present in the area adjacent the welding operation with a view of preventing, as far as possible, oxidation of the weld.

Another object of the invention is to provide a method of welding wherein the top of the weld is shielded against oxidation by generating a gas to unite with oxygen and wherein the base of the weld is protected by a backing which gives off a shielding gas.

Another object of the invention is to improve the texture and ductility of electric arc welds by the use of a combustible backing element.

Another object of the invention is to provide a smooth inside surface on welded pipe joints by the use of a combustible backing element, which will be consumed after the weld has been completed.

Another object of the invention is to provide a temporary backing element for welding operations.

Still another object of the invention is to provide a backing element which is inflammable and which will be ignited by the heat of the welding operation after it has supported the molten material in the weld.

Another object of the invention is to provide a backing ring which will be heated by the welding operation to give off a gas having a greater affinity for oxygen than has the molten metal of the weld.

Other and further objects of the invention will be readily apparent to those skilled in the art when the following description is considered in connection with the accompanying drawing, but it is intended that the invention will broadly cover a means and method of improving the texture and ductility of welds.

Fig. 1 is a central vertical section of two pipe ends which are being welded in accordance with the present invention and shows the positioning of the backing element.

Fig. 2 is a transverse section showing the positioning of the welding rod as well as the flow of gas about the weld and the backing element while the weld is being formed.

Fig. 3 is a broken detail view looking down on the weld as it is being made and indicating the flow of gases and molten metal.

Fig. 4 is a sectional view taken on the line 4—4 of Fig. 2 and looking in the direction of the arrows. This shows the molten metal being pushed forward or compacted and also shows the arrangement of the backing ring.

The present application relates to and broadly includes the subject matter of my prior copending application Serial No. 548,797, filed July 6, 1931, for a means of welding pipe.

It is contemplated that the invention will broadly cover any means or method of welding wherein the base of the weld is shielded from oxidation. One form of the invention is disclosed herein, which form includes the use of a combustible or inflammable backing which is positioned beneath the area to be welded so that the heat of the weld will char the backing element. The element is composed of any suitable material which will create a shield for the weld from oxidation. In practice it has been found that a backing element of pressed paper, wood pulp, or other similar substances serve satisfactorily. The material is preferably compressed to such a degree that it will burn incompletely when subjected to the heat of an electric arc. When such materials are charred a vapor is given off which has a greater affinity for oxygen than has the molten metal in the weld and thus prevents oxygen from getting to the molten metal as it is absorbed by the generated gas. While substances giving off carbon monoxide gas have been described it is intended that any substance which will give off a protective shield of vapor may be employed.

With a view of disclosing the invention, Fig. 1 shows a pipe end 2 and the opposite pipe end 3, which are to be united together. While the invention described the uniting of pipe ends it is to be distinctly understood that sheets of metal or any other welded connection may be made in accordance with the present invention. These pipe ends are usually positioned upon a rotatable support, such as 4, so that they can be slowly turned in order that the welder may work on the top side of the pipe. Of course, if sheets or other joints are being welded it is contemplated that some suitable support will be provided so that the welding may be conveniently performed. The pipe ends 2 and 3 are indicated as being beveled at 5 and 6, respectively. While a beveled end is preferred, any squared end article may be welded by the present method. It should be noted that the ends 2 and 3 do not come in contact with each other but are spaced slightly apart to leave the opening 7 at the base.

In order that a support will be provided to prevent the molten material from forming an irregular surface on the joint or connection, a backing element 10 has been provided. This backing element serves the dual purpose of supporting the molten material at the base of the weld until the same solidifies and also serves the purpose of providing a shield to prevent oxidation at the base of the weld. The ring, as stated heretofore, may be made of any suitable material to accomplish the above purpose. The ring 10 is shown as being positioned inside of the two pipe ends in Fig. 1. This ring has preferably been inserted in one of the pipe ends, such as 3, by having the edge 11 thereof inserted in the pipe end. The ring is preferably moved about half way into the end 3 with the edge 12 projecting from the pipe.

The pipe end 2 is then brought into position and telescoped over the edge 12 of the ring, so that the parts assume the position shown in Fig. 1. To expedite the positioning of the pipe end 2, the edge 12 of the ring is slightly rounded or curved, as at 13. The adjacent ends may be moved to contact each other but it has been found that a more satisfactory weld is obtained when the ends are spaced apart slightly, as shown.

As soon as the parts are in this position they are ready for the welding to begin. The arc is struck and the welding is performed in a manner best seen in Fig. 2. The welder moves the welding rod 15 slightly from side to side so that the arc will play on the beveled faces 5 and 6. In this manner the beveled surfaces are melted to form an irregular surface, such as 16, best seen in Fig. 3. The molten material, of course, moves into the base of the weld and, as now practiced, a stringer bead 17 of welding material is positioned in the base of the groove. This stringer bead is seen in section in Fig. 2 but as shown does not fill the groove. While this manner of welding is here disclosed it is not intended that the invention shall be limited to the forming of a stringer bead and then subsequently completing the weld. Figs. 3 and 4 show the weld being completed in one operation. This stringer bead, of course, does not include any great volume of welding material and for this reason an excessive amount of heat is not applied to the ring 10. As seen in Fig. 3, the ring has been charred on the surface as at 18, due to the heat of the positioning of the stringer bead. In practice, however, the portion of the backing 10 seen in Fig. 3, above the broken away portion of the pipe or sheet, would be ignited and burning by the time the welding operation had passed.

It is at this point that one of the essential novelties of the present invention occurs. When the ring 10 is heated it gives off a gas. This gas is generated at the very base of the weld. As seen in Fig. 4, there is a very slight opening, such as 20, between the ring and the inside surface 21 of the part being welded. Some of the gas generated is in the area between the surface 21 and the surface of the ring 20 but back from the end or edge of the element being welded. Thus considerable of the gas is generated in the joint 22, see Fig. 4. Some of this gas escapes laterally to the inside of the pipe but a majority of it passes into the base of the welding area.

It has been found that where the ring 10 is formed of a material which gives off a gas which has an affinity for oxygen, that the weld is materially improved. This improvement in the weld is due to the shielding of the weld against the entrance of oxygen. If the base is shielded by the cloud of gas generated by the ring 10, then obviously there can be no entrance of oxygen to cause oxidation of the base of the weld. If the gas generated by the ring 10 has a greater affinity for oxygen than has the molten metal, then any oxygen entering the top of the weld will also combine with the gas present rather than combining with the molten metal. With this situation in mind it seems apparent that the base of the weld is adequately protected. There will be no pin holes or blow holes in the weld, because there will be no oxidation. The vapor or gas generated at the very source of the heat forms a shield which precludes the entrance of any great amount of oxygen. The groove in which the weld is formed is filled with generated gas ahead of the weld as indicated in Figs. 2 and 3. While there is some air drawn into the welding area by the push of the arc the generated vapor excludes so much air that a very fine weld is obtained which has fine texture and great ductility.

As is well understood, various expedients have been employed in attempting to protect the top of the weld against oxidation. These expedients include the provision of various types of coated welding rods which tend to absorb oxygen and protect the surface. Innumerable instances have occurred where the upper portion of the weld was free of oxidation when a coated rod had been used but the base of the weld was crystallized and weak because there was no protection at the base. With the present invention, however, the base is completely protected. The top has been protected to some extent by methods now well known, but with the double protection of a coated rod and combustible backing a perfect weld is obtained.

Due to the fact the weld is of a very fine texture and the material of the weld is not oxidized the ductility of the weld is materially increased. With experiments conducted upon welds made in accordance with this disclosure a ductility of more than one hundred per cent was observed.

While the welding operation is being performed the gases given off by the welding rod tend to form currents which flow toward the welded material due to the expansion of the gases by being heated. Fig. 3 shows the arrows 25 to indicate the air which is drawn in beneath the welding rod 15 due to the flow of gases: whereas the flow of gases from the forward end of the rod is indicated by the arrows 26. The irregular lines 27 generally represent a cloud of gases which are about the welding operation and tend to protect the same. A portion of this gas is given off by the backing element and the gas fills the groove where the weld is being formed.

In electric welding there is a definite push or flow of molten material away from the lower end 28 of the welding rod, which flow of the molten fluid is indicated by the arrow 29 in Fig. 2. The flow of this material is apparent in the finished weld and is indicated by the waves or flow lines 30, seen in Fig. 3. The molten material forms in these waves 30 and they are deposited as seen in Fig. 4. If there is no oxygen present at this stage of the weld the metal is deposited without pin or blow holes and of very fine texture. As previously explained, some of the gases given off at the base of the weld will pass between the inside of the pipe and the welding ring 10. These gases are indicated by the line 31 in Fig. 2.

If the weld is completed in one operation, as seen in Fig. 3, the ring 10 will be charred and become ignited so that it will be consumed. As shown in the drawing, the ring is of considerable area. The volume to be consumed is thus considerable and, inasmuch as the ring is composed of a compressed material, the combustion is rather slow and no part of the ring is wholly consumed until such a period has elapsed which will permit completing of the weld. In this manner the weld remains intact and supports the entire surface of the weld until the need for backing has disappeared.

If the weld being made is a flat surface, of course, the complete combustion of the ring would not be as important as it would be in using the backing in a closed pipe. Thus if the ring were charred while backing a flat surface sufficiently to give off the protective gas, its purpose would then have been served. With a closed pipe, however, complete combustion of the ring is desirable because it removes the ring as an obstruction in the pipe and the residue is but a small amount of ash which can be carried from the pipe by the usual draft or can be washed or blown from the pipe in any desired manner.

If the weld is accomplished by placing the stringer bead 18 and finally completing the weld with a finishing layer, it has been found that the backing ring or element is not ignited when the stringer bead is formed but that the surface is merely charred, as at 18, and by this charring a sufficient protective gas has been generated. When the next trip is made to complete the weld, the operation may be slower or the rod may be larger so that a greater amount of material will be placed. In either instance, the heat generated is greater, and the pipe ends, as well as the stringer beads 17, are still hot from the first operation. Thus the heat penetrates to the backing element more readily and there is a greater amount of heat present. The backing element is accordingly ignited, and from observation it has been noted that the ignition of the backing element follows quite closely the finishing or completion of the weld.

What I claim is:

1. In the art of welding the step of backing of the weld with a combustible material to be charred during the making of the weld and to give off a gas upon charring which will combine with oxygen.

2. In the art of welding including the steps of positioning a combustible backing beneath the area to be welded, initiating the welding operation whereupon the backing is heated to give off a gas to protect the base of the weld against oxidation.

3. In electric arc welding including the steps of heating a combustible backing element with the heat of the weld to generate gas at the base of the weld.

4. A method of obtaining a smooth inner surface when electric welding plain end pipe by backing up the weld with a combustible element which is ignited during the weld and is removed by being consumed.

5. A method of backing up an electric arc weld including positioning a combustible element beneath the area to be welded, striking the arc, heating the metal and the element so that gas given off upon charring of the element will protect the base of the weld against oxidation.

6. In arc welding the step of backing of the welding area with a combustible material to be charred during the making of the weld and to give off a gas at the base of the weld.

7. A method of welding including positioning the ends to be welded, placing a backing element beneath the ends, initiating the welding so that the heat will fuse the metal and char the backing element to give off a gas at the base of the weld.

8. A method of welding to prevent oxidation at the base of a weld including providing a combustible substance at the base of the weld, and charring the substance with the welding heat to give off a gas which will obsorb oxygen.

9. A combustible backing ring for use in welding, said ring being composed of material adapted to give off carbon monoxide gas when charred.

10. A backing for welding operations adapted to give off a shielding gas for the base of the weld when charred by the heat of the welding.

11. In the arc welding of pipes the step which consists of presenting at the base of the weld a material which backs up the weld and is combustible to eliminate itself as an obstruction in the pipe.

12. In arc welding the step which consists of heating the parts to be welded, and simultaneously heating a combustible material at the base of the parts being welded so that an oxygen absorbent gas is produced at the base of the weld.

13. A combustible weld backing member consisting of a body of material to act as a base for the weld during the initial introduction of molten metal to the weld, said body comprising combustible material adapted to be ignited by the heat of the positioned metal of the weld as such metal solidifies, said body being adapted to be reduced to an ash so that substantially no obstruction remains after the welding operation is completed.

14. The step in a welding operation of placing a backing for the weld beneath the area to be welded which backing will be consumed when ignited by the welding heat.

15. A temporary weld backing element composed of combustible material, said material being ignitible by the heat of the welding operation so that the element will be reduced to an ash by burning.

16. A weld backing element consisting of a body of combustible gas forming substances ignitible by the heat of welding and reducible to an ash by burning so that the element is removed as a substantial obstruction after the weld is completed.

17. A weld backing ring adapted to be positioned in pipes during the welding operation including a body, a smooth outer face thereon to back up the weld, said body being composed of a material which will be ignited by the heat of the welding operation and reduced to an ash whereby no obstruction will remain in the welded pipe.

18. The art of obtaining a smooth inner surface when welding pipe joints, the step of backing up the weld with an ignitable material adapted to consume itself so that no obstruction remains in the pipe.

19. A backing ring including a body, a smooth outer periphery on said ring adapted to abut the inside of the pipe to be welded, said body being of a width greater than the area to be welded so that the welding material will be confined between the ends of the pipes, said ring body being composed of an ignitable material which will be fired by the heat of the welding operation and which will consume itself to leave substantially no ash and no solid obstruction in the pipe.

JOSEPH J. KANE.